C. W. STARKER & G. L. S. KRONFELD.
ARMATURE FOR DYNAMO ELECTRIC MACHINES.
APPLICATION FILED OCT. 30, 1916.
1,300,508.
Patented Apr. 15, 1919.
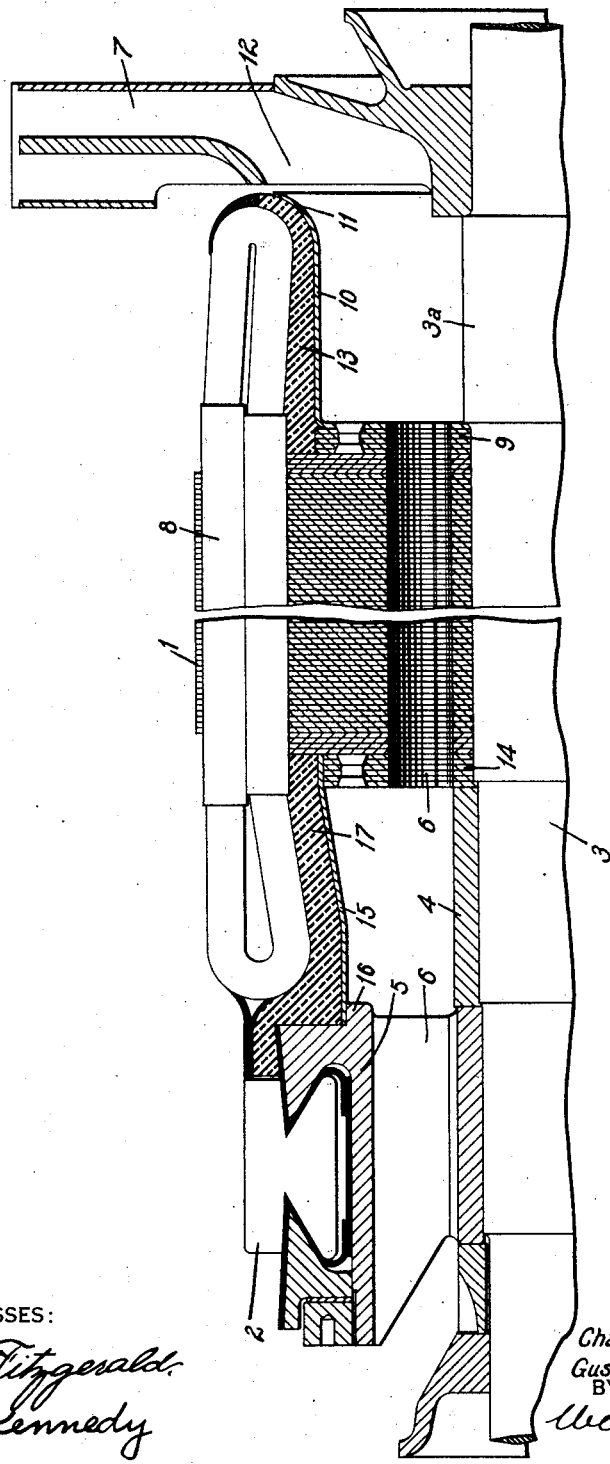
WITNESSES:
P. J. Fitzgerald.
O. N. Kennedy
INVENTOR
Charles W. Starker, and
Gustav L. S. Kronfeld.
BY
Wesley G. Carr
ATTORNEY

UNITED STATES PATENT OFFICE.

CHARLES W. STARKER, OF PITTSBURGH, AND GUSTAV L. S. KRONFELD, OF WILKINSBURG, PENNSYLVANIA, ASSIGNORS TO WESTINGHOUSE ELECTRIC AND MANUFACTURING COMPANY, A CORPORATION OF PENNSYLVANIA.

ARMATURE FOR DYNAMO-ELECTRIC MACHINES.

1,300,508.     Specification of Letters Patent.     Patented Apr. 15, 1919.

Application filed October 30, 1916. Serial No. 128,415.

*To all whom it may concern:*

Be it known that we, CHARLES W. STARKER, a subject of the Emperor of Germany, and a resident of Pittsburgh, in the county of Allegheny and State of Pennsylvania, and GUSTAV L. S. KRONFELD, a subject of the King of Great Britain, and a resident of Wilkinsburg, in the county of Allegheny and State of Pennsylvania, have invented a new and useful Improvement in Armatures for Dynamo-Electric Machines, of which the following is a specification.

Our invention relates to armatures for dynamo-electric machines, and it has for its object to provide an armature that is particularly adapted to be embodied in light-weight electric motors of the self-ventilating type.

With the development of small electric railway vehicles commonly known as "one man cars", it has been found necessary to reduce the weights of the electric motors that are placed on such vehicles without materially decreasing the strength of the various parts of such motors.

According to our invention, we provide an armature structure for such light-weight motors in which a material reduction in weight is effected by providing a novel form of support for the over-hanging end portions of the armature coils. Furthermore, the coil supports are so related to the armature core that its magnetizability is materially increased. As the size of the armature ventilating ducts is necessarily reduced in light-weight motors, our invention further contemplates an arrangement of parts wherein the ventilating air has an entirely unobstructed passage through the armature.

The single figure of the accompanying drawing is a transverse sectional view through the armature of an electric motor embodying our invention.

The armature comprises a slotted magnetizable core member 1 and a commutator cylinder 2 that are mounted on a shaft 3 and are spaced apart by a collar 4. The core member 1 and a spider 5 of the commutator cylinder 2 are respectively provided with a plurality of longitudinal ducts 6. A fan 7 is mounted on the shaft 3 and is spaced from the core 1 by an enlargement 3ᵃ of the shaft. A plurality of armature coils 8 are located in the slots of the core member 1, with their end portions projecting beyond the ends of the core member 1 into the spaces between the core member and the commutator cylinder 2 and between the core member and the fan 7, respectively. A plurality of unslotted annular magnetizable plates 9 of smaller diameter than the core member 8 are mounted on the shaft 3 between the core member 1 and the enlargement 3ᵃ of the shaft. One of the plates 9 nearest the fan 7 is provided with a cylindrical portion 10 extending longitudinally of the shaft 3 and a flared-out portion 11 that substantially incloses the intake opening 12 of the fan 7. A layer 13 of insulating material is located between the right hand end portions of the coils 8 and the cylindrical portion 10 so that the end-portions are rigidly supported thereby. A plurality of plates 14, similar in form to the plates 9, are mounted on the shaft 3 between the core member 1 and the collar 4. A hollow, substantially cylindrical member 15 is adapted to fit over the plates 14 and is supported, at its other end, by an annular projection 16 that is provided on the commutator spider 5. A layer 17 of insulating material is located between the member 15 and the left-hand end portions of the armature coils 8. The respective groups of plates 9 and 14 are riveted or welded together to form substantially unitary structures and are held in close engagement with the respective ends of the core member 1 by the shaft enlargement 3ᵃ and the collar 4. It is obvious that the supporting member 15 may be readily formed integral with one of the plates 14, as described with reference to the cylindrical portion 10.

From the foregoing, it is apparent that the overhanging end portions of the armature coils 8 will be supported by comparatively light weight plate members that are intimately associated with portions of magnetizable material so related to the core member that its magnetizability is materially increased. Armatures, as heretofore constructed, have usually employed coil-supporting members mounted on the armature shaft independently of the core member so that the spaces adjacent the ends of the core member were usually partially obstructed by the radial ribs of such coil supports. It is obvious from a consideration of our improved armature construction that the use of cylindrical coil supports that are substantially integral with the core member leaves the spaces between the ducts and between the ducts and the fan entirely unobstructed, so that a maximum amount of ventilating air may pass through the armature.

While we have shown our invention in its preferred form, it is not so limited but is susceptible of various minor changes and modifications within the scope of the appended claims.

We claim as our invention:

1. In an armature for dynamo-electric machines, the combination with a magnetizable body member provided with a plurality of slots, and a plurality of coils located in said slots and having overhanging end portions, of means disposed adjacent to the respective ends of said body member to increase the magnetizability thereof and to support the end portions of said coils.

2. In an armature for dynamo-electric machines, the combination with a magnetizable body member provided with a plurality of slots, and a plurality of coils located in said slots and having overhanging end portions, of magnetizable material disposed adjacent to the respective ends of said body member and comprising means for supporting the end portions of said coils.

3. In an armature for dynamo-electric machines, the combination with a magnetizable body member provided with a plurality of slots and a plurality of coils located in said slots and having overhanging end portions, of a plurality of magnetizable plates secured to the respective ends of said body portion and within said end portions, one of said plates being provided with an extended portion to support the end portions of said coils.

4. In an armature for dynamo-electric machines, the combination with a magnetizable body member provided with a plurality of slots and a plurality of coils located in said slots and having overhanging end portions, of a plurality of plates of magnetizable material secured to the respective ends of said body portion and within said end portions, one of said plates being cup-shaped and adapted to support the end portions of said coils.

5. In an armature for dynamo-electric machines, the combination with a shaft, a slotted magnetizable core member and a commutator cylinder mounted on said shaft in spaced relation, a plurality of coils located in the slots of said core member and having projecting end portions extending into the space between said core member and said commutator cylinder, of a member supported at its ends by said commutator cylinder and said core member, respectively, for supporting the end portions of said coils.

6. In an armature for dynamo-electric machines, the combination with a shaft, a slotted magnetizable core member and a commutator cylinder mounted on said shaft in spaced relation, a plurality of coils located in the slots of said core member and having projecting end portions extending into the space between said core member and said commutator cylinder, of a quantity of magnetizable material secured to one end of said core member within said end portions and a member carried thereby and supported by said commutator cylinder for supporting the end portions of said coils.

7. In an armature for dynamo-electric machines the combination with a shaft, a slotted core member provided with longitudinal ducts and a fan mounted thereon in spaced relation, and a plurality of coils located in the slots of said core member and having projecting end portions extending into the space between said core member and said fan, of means for supporting the end portions of said coils and for increasing the magnetizability of said core without obstructing the space between the said ducts and the said fan.

8. In an armature for dynamo-electric machines, the combination with a shaft, a slotted core member provided with longitudinal ducts and a fan mounted thereon in spaced relation, and a plurality of coils located in the slots of said core member and having projecting end portions, of a cup-shaped member secured to said core member for increasing the magnetizability thereof and for supporting the end portions of said coils, whereby the space between said ducts and said fan is unobstructed.

9. In an armature for dynamo-electric machines, the combination with a shaft, a slotted core member and a commutator cylinder provided with longitudinal ducts and a fan mounted thereon in spaced relation, and a plurality of coils located in the slots of said core member and having projecting end portions, of means for supporting the end portions of said coils and for increasing the magnetizability of said core without obstructing the spaces between the ducts of said core member and of said commutator cylinder and between the ducts of said core member and said fan.

In testimony whereof, we have hereunto subscribed our names this 17th day of Oct., 1916.

CHARLES W. STARKER.
GUSTAV L. S. KRONFELD.